US012734803B2

(12) United States Patent
Konishi

(10) Patent No.: US 12,734,803 B2
(45) Date of Patent: Sep. 15, 2026

(54) LIQUID EJECTION HEAD

(71) Applicant: RISO Technologies Corporation, Tokyo (JP)

(72) Inventor: Tsubasa Konishi, Sunto Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 96 days.

(21) Appl. No.: 18/503,880

(22) Filed: Nov. 7, 2023

(65) Prior Publication Data

US 2024/0278563 A1 Aug. 22, 2024

(30) Foreign Application Priority Data

Feb. 22, 2023 (JP) ................................ 2023-026507

(51) Int. Cl.
*B41J 2/14* (2006.01)

(52) U.S. Cl.
CPC .. *B41J 2/14209* (2013.01); *B41J 2002/14362* (2013.01); *B41J 2002/14491* (2013.01); *B41J 2202/12* (2013.01)

(58) Field of Classification Search
CPC .......... B41J 2/14209; B41J 2002/14362; B41J 2002/14491; B41J 2202/12
See application file for complete search history.

(56) References Cited

U.S. PATENT DOCUMENTS

| | | | | |
|---|---|---|---|---|
| 8,025,368 | B2 * | 9/2011 | Watanabe | B41J 2/1642 347/68 |
| 2005/0275695 | A1 | 12/2005 | Murata | |
| 2008/0024560 | A1 | 1/2008 | Ishizuka | |
| 2010/0238237 | A1 | 9/2010 | Seki | |
| 2013/0250005 | A1 * | 9/2013 | Koyata | B41J 2/1643 156/60 |
| 2023/0063950 | A1 | 3/2023 | Konishi | |
| 2023/0064827 | A1 | 3/2023 | Oguma | |
| 2023/0101170 | A1 | 3/2023 | Shimosato | |

OTHER PUBLICATIONS

Extended European Search Report dated Jun. 6, 2024, mailed in counterpart European Application No. 23218391.3, 9 pages.

* cited by examiner

*Primary Examiner* — Geoffrey S Mruk
(74) *Attorney, Agent, or Firm* — Kim & Stewart LLP

(57) ABSTRACT

According to one embodiment, a liquid ejection head includes an actuator with a plurality of pressure chambers spaced from each other in a first direction. Each pressure chamber extends lengthwise in a second direction intersecting the first direction. An anti-reflection film is on an inner surface of the pressure chambers. A diaphragm portion is at an end of each pressure chamber. The diaphragm portion provides a flow cross-section that is less than the pressure chamber and is between the pressure chamber and a common chamber to which the pressure chambers are fluidly connected.

19 Claims, 8 Drawing Sheets

LIQUID EJECTION HEAD

CROSS-REFERENCE TO RELATED APPLICATION

This application is based upon and claims the benefit of priority from Japanese Patent Application No. 2023-026507, filed on Feb. 22, 2023, the entire contents of which are incorporated herein by reference.

FIELD

Embodiments described herein relate generally to a liquid ejection head.

BACKGROUND

In recent years, demand for high productivity from inkjet heads has increased, and increasing speeds and amounts of ejected liquid droplets has become an issue. A shear-mode shared-wall type inkjet head has high ejection power and is suitable for ejecting high-viscosity ink and large droplets. In the shear-mode shared-wall type inkjet head, the same driving column is shared by two adjacent pressure chambers, and groups of ⅓ of the total number of arranged chambers are driven at the same time. That is, a so-called three-cycle drive is commonly used. Independent drive heads have also been developed in which dummy pressure chambers are on both sides of a pressure chamber to be driven and two drive columns are used to drive each pressure chamber. A structure for inkjet heads has been developed in which a large number of grooves are formed in a piezoelectric body, the outlet/inlet of each groove is blocked for every other one of the grooves. The grooves without blocking of the outlet/inlet are used as the pressure chambers which can be independently driven, and the blocked grooves are used as air chambers (dummy pressure chambers).

In such an inkjet head, the ink is supplied from a common liquid chamber to a pressure chamber after ink liquid droplets have been ejected. In this process, a phenomenon may occur by which the nozzle overshoots and the meniscus rises. The smaller the fluid resistance of the flow path from the common liquid chamber to the nozzles, the greater the overshoot will be, and thus, if the overshoot is not accounted for, the meniscus cannot be in a stable state for ejections. Therefore, in order to increase a speed of the inkjet head, it is required to quickly ensure stable ejection characteristics. Although, there is a method of forming a diaphragm portion using a photosensitive resin at an opening of the groove (outlet/inlet of the pressure chamber) as a means of increasing the fluid resistance, due to the effects of light reflection from the bottom and the side walls of the pressure chamber during the exposure process for forming the diaphragm portion, it may be difficult to form the diaphragm portion with high precision because unintended portions of the photosensitive reason may be exposed by reflections and the like.

DETAILED DESCRIPTION

The present embodiment relates to a liquid ejection head with stable ejection characteristics.

According to one embodiment, a liquid ejection head includes an actuator with a plurality of pressure chambers spaced from each other in a first direction. Each pressure chamber extends lengthwise in a second direction intersecting the first direction. An anti-reflection film is on an inner surface of the pressure chambers. A diaphragm portion is at an end of each pressure chamber. The diaphragm portion provides a flow cross-section that is less than the pressure chamber and is between the pressure chamber and a common chamber to which the pressure chambers are fluidly connected.

Figure 1:
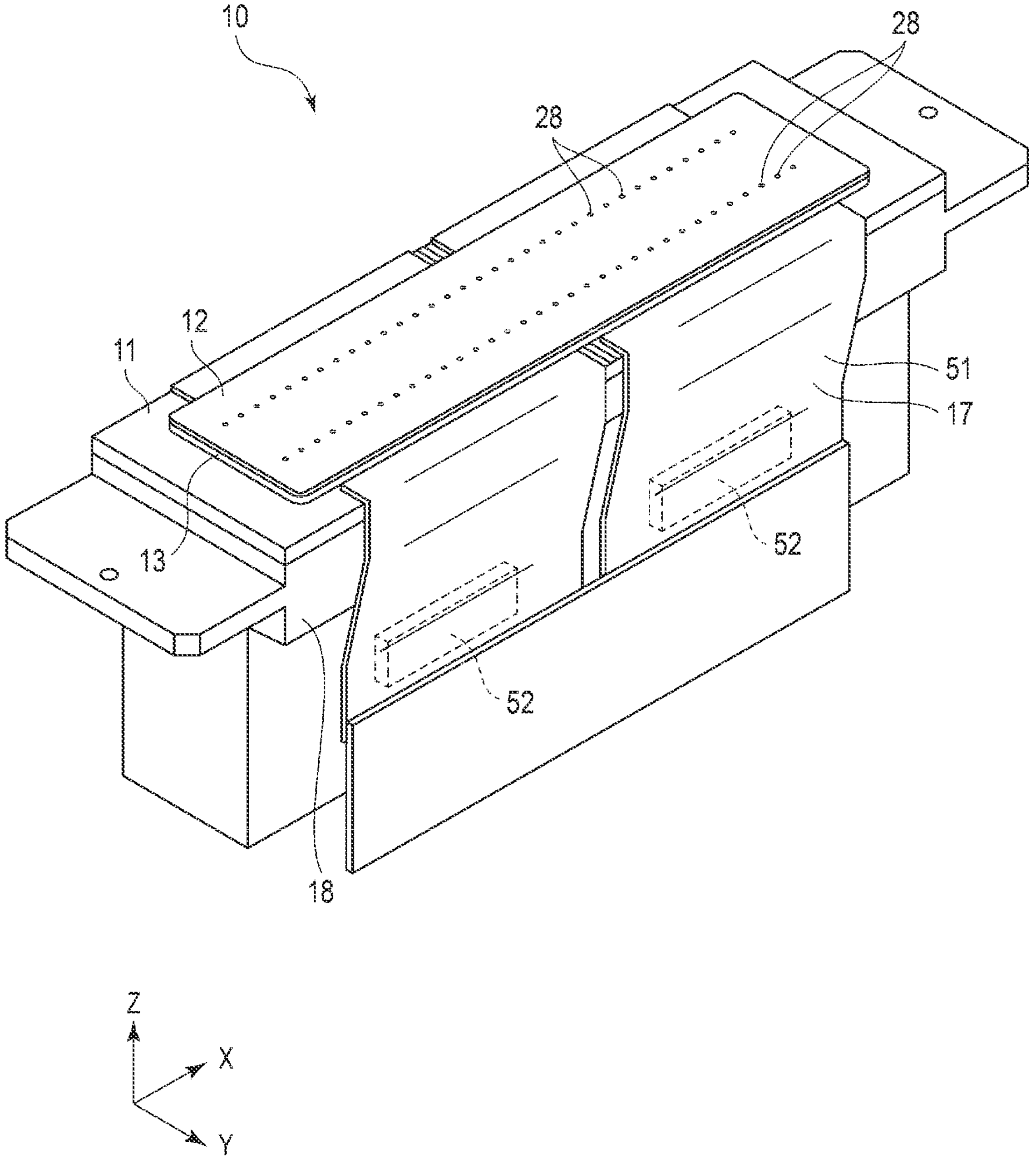
FIG. 1 is a perspective view illustrating an inkjet head according to an embodiment.
Figure 2:
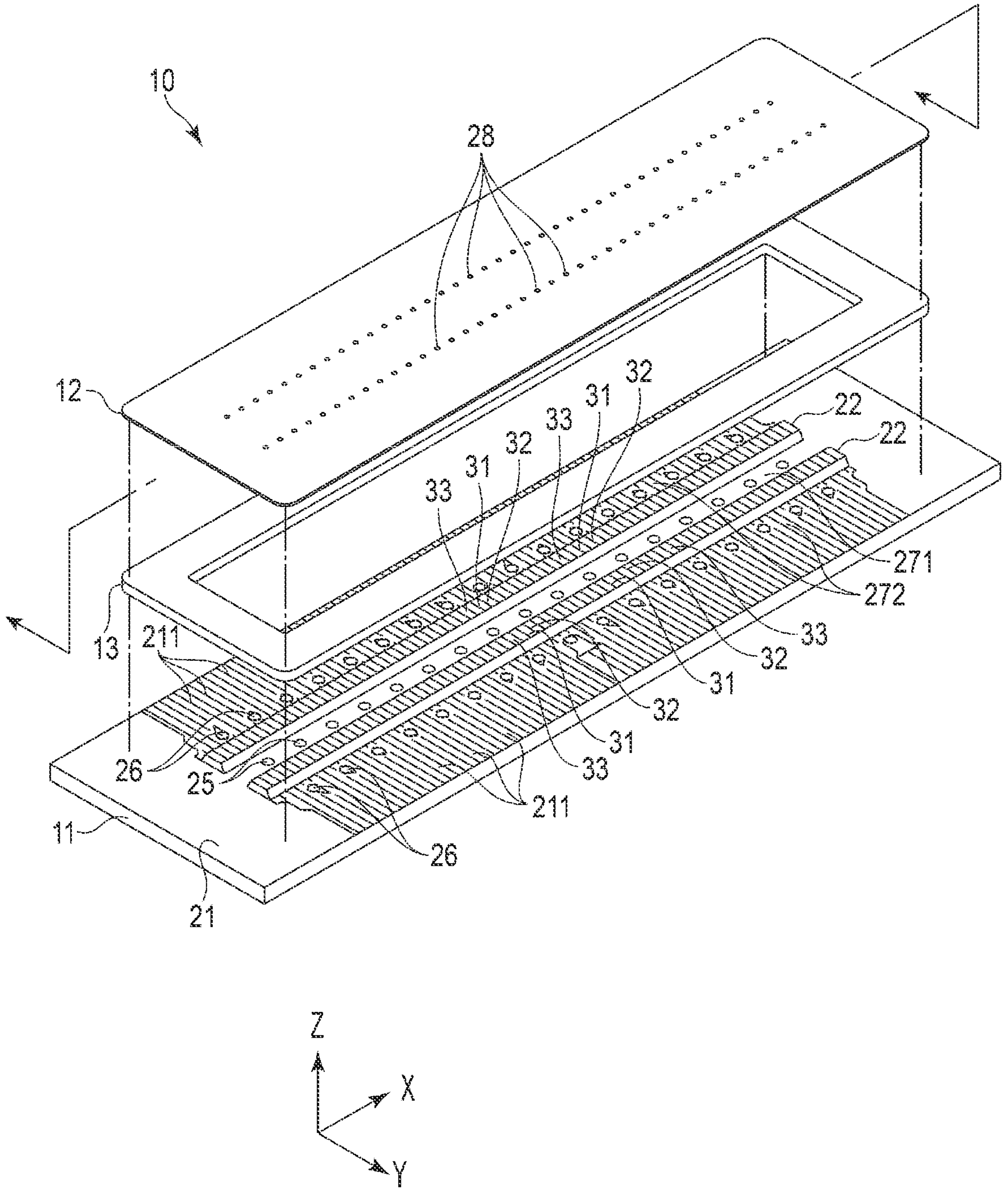
FIG. 2 is an exploded view illustrating a configuration of a portion of the inkjet head.
Figure 3:
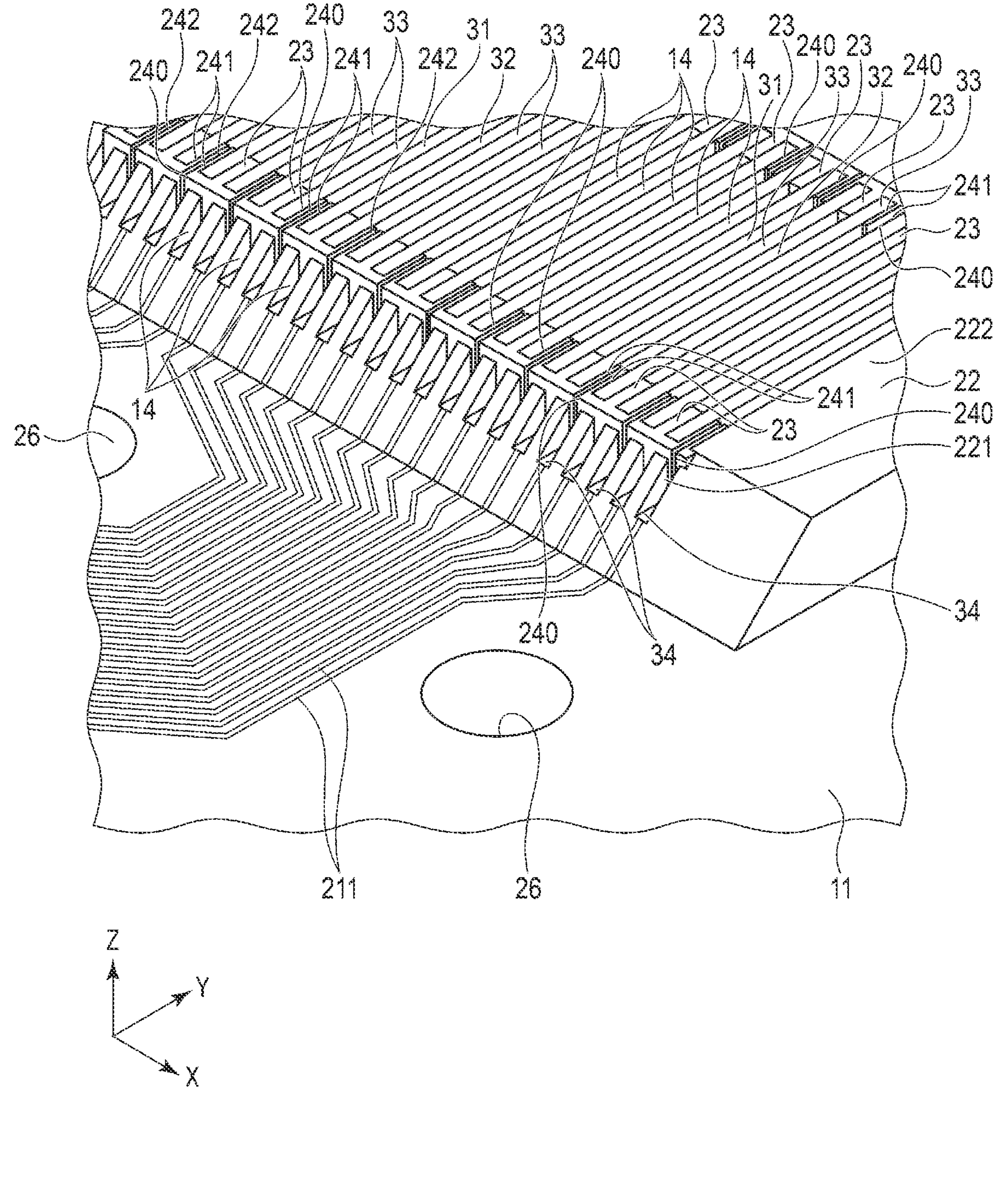
FIG. 3 is an enlarged view illustrating a portion of an inkjet head.
Figure 4:
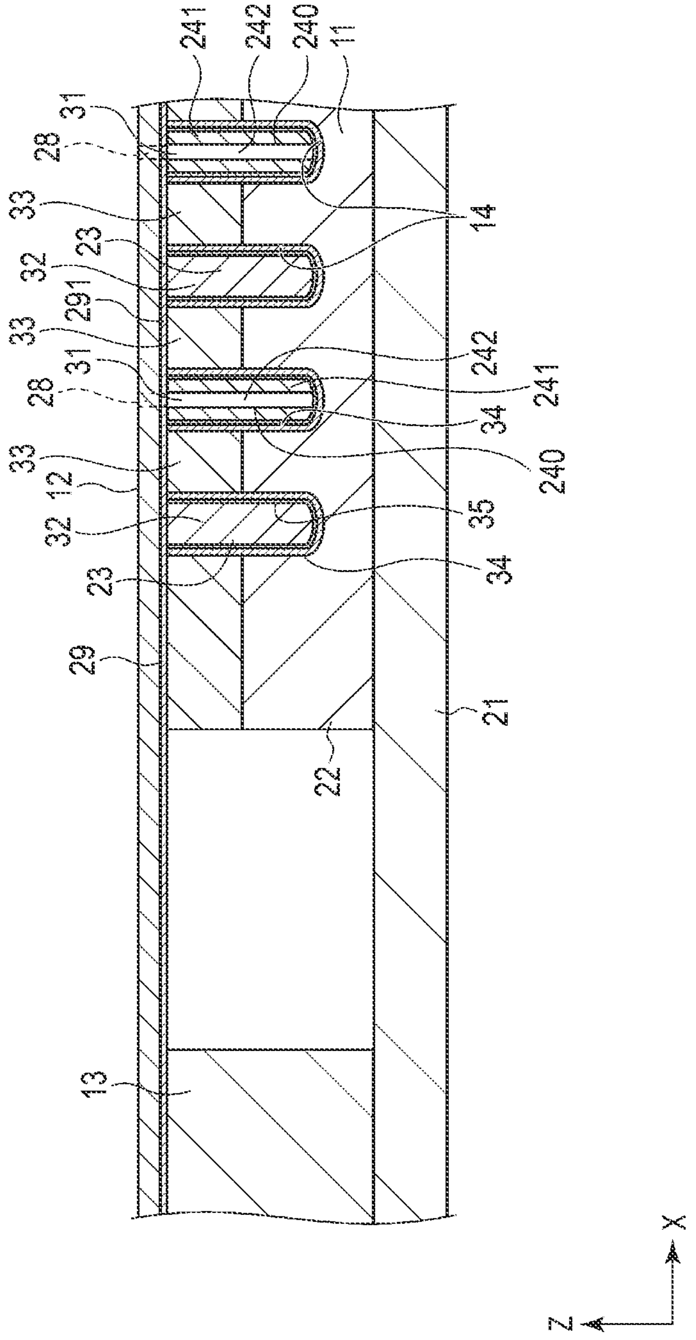
FIG. 4 is a cross-sectional view of a portion of an inkjet head.
Figure 5:
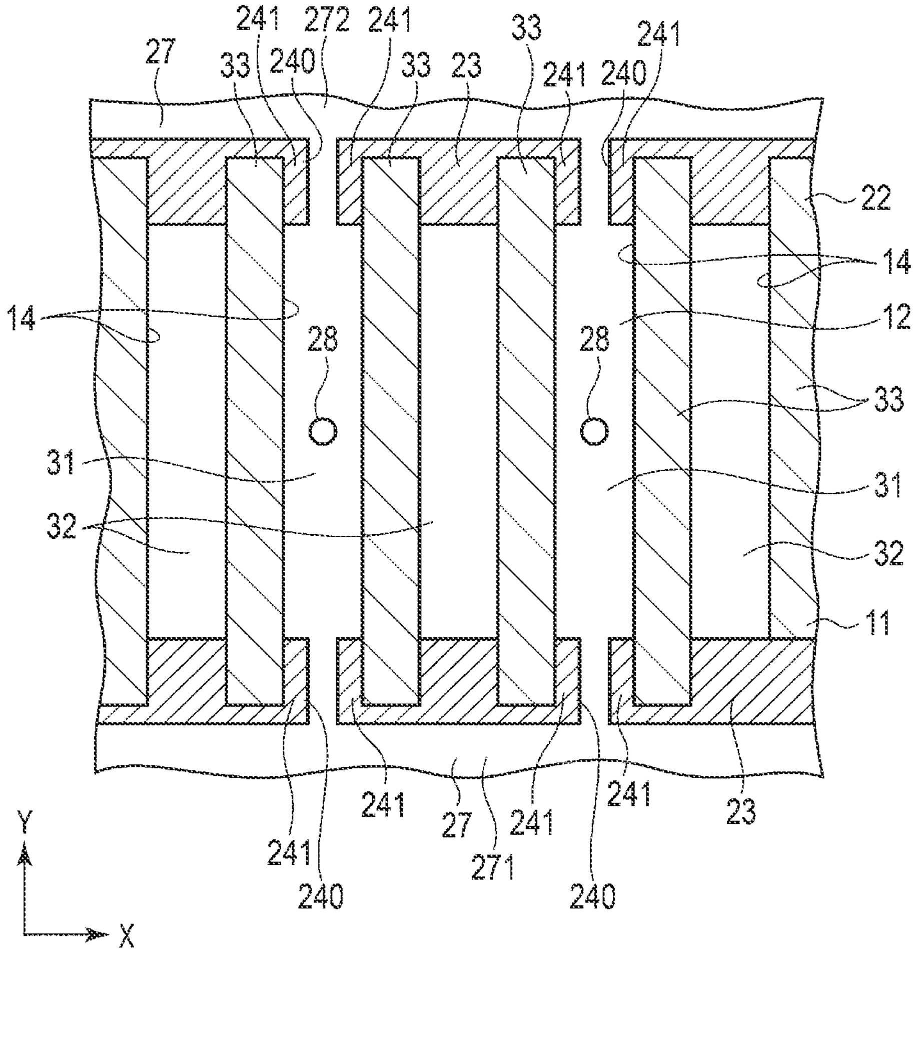
FIG. 5 is a cross-sectional view of a portion of an inkjet head.
Figure 6:
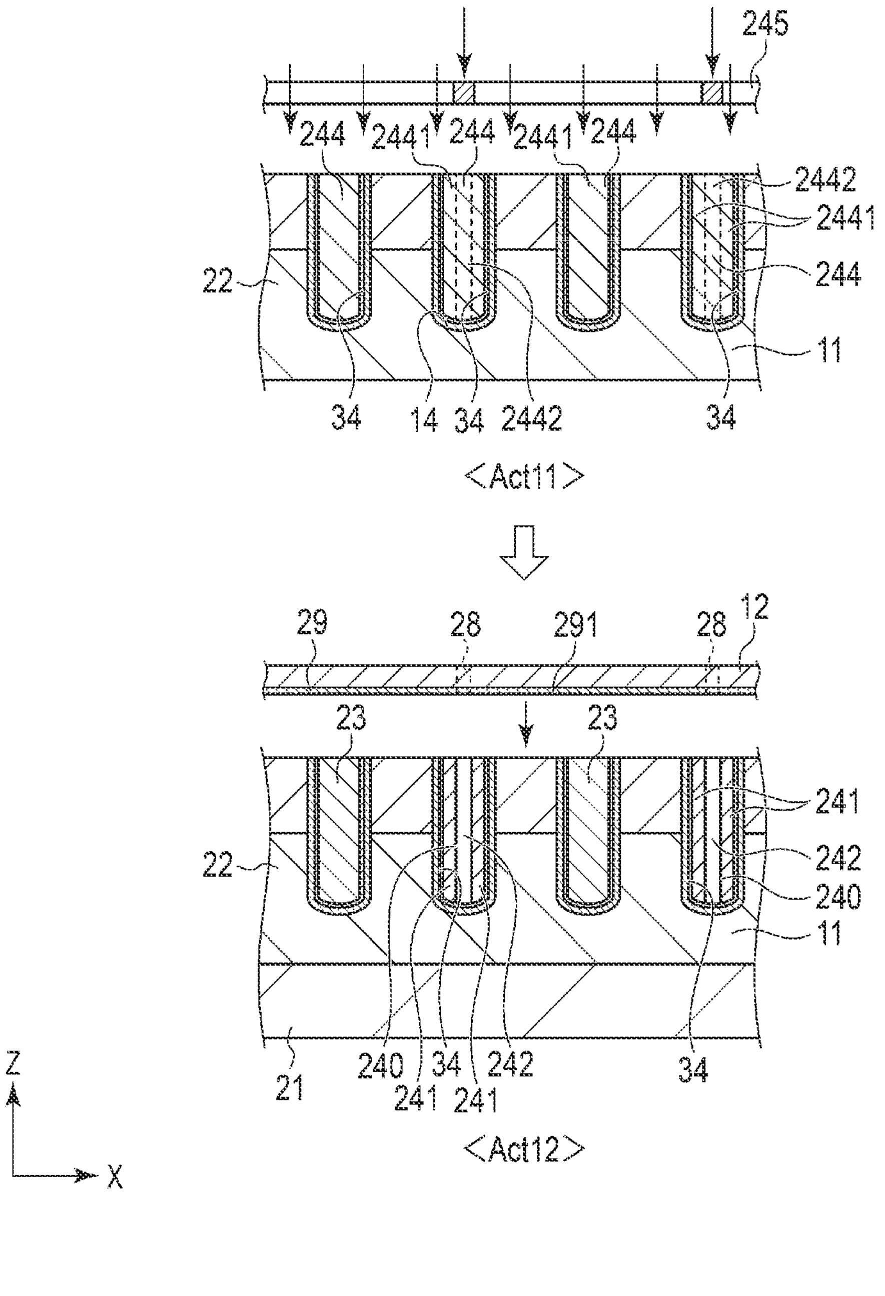
FIG. 6 depicts aspects of a method for manufacturing the inkjet head.
Figure 7:
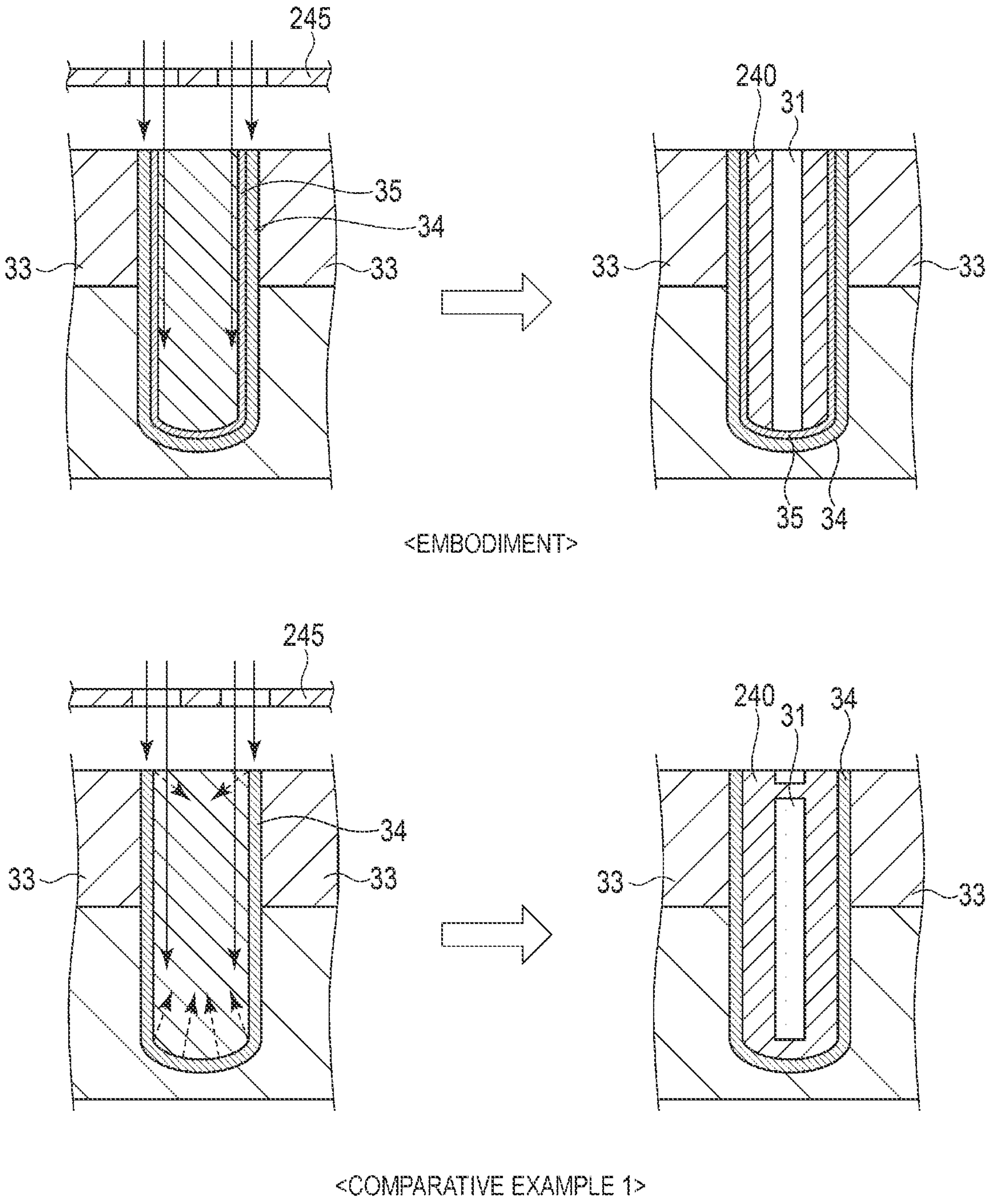
FIG. 7 depicts aspects of the configurations and manufacturing methods of an inkjet head according to an embodiment and an inkjet head according to a comparative example.
Figure 8:
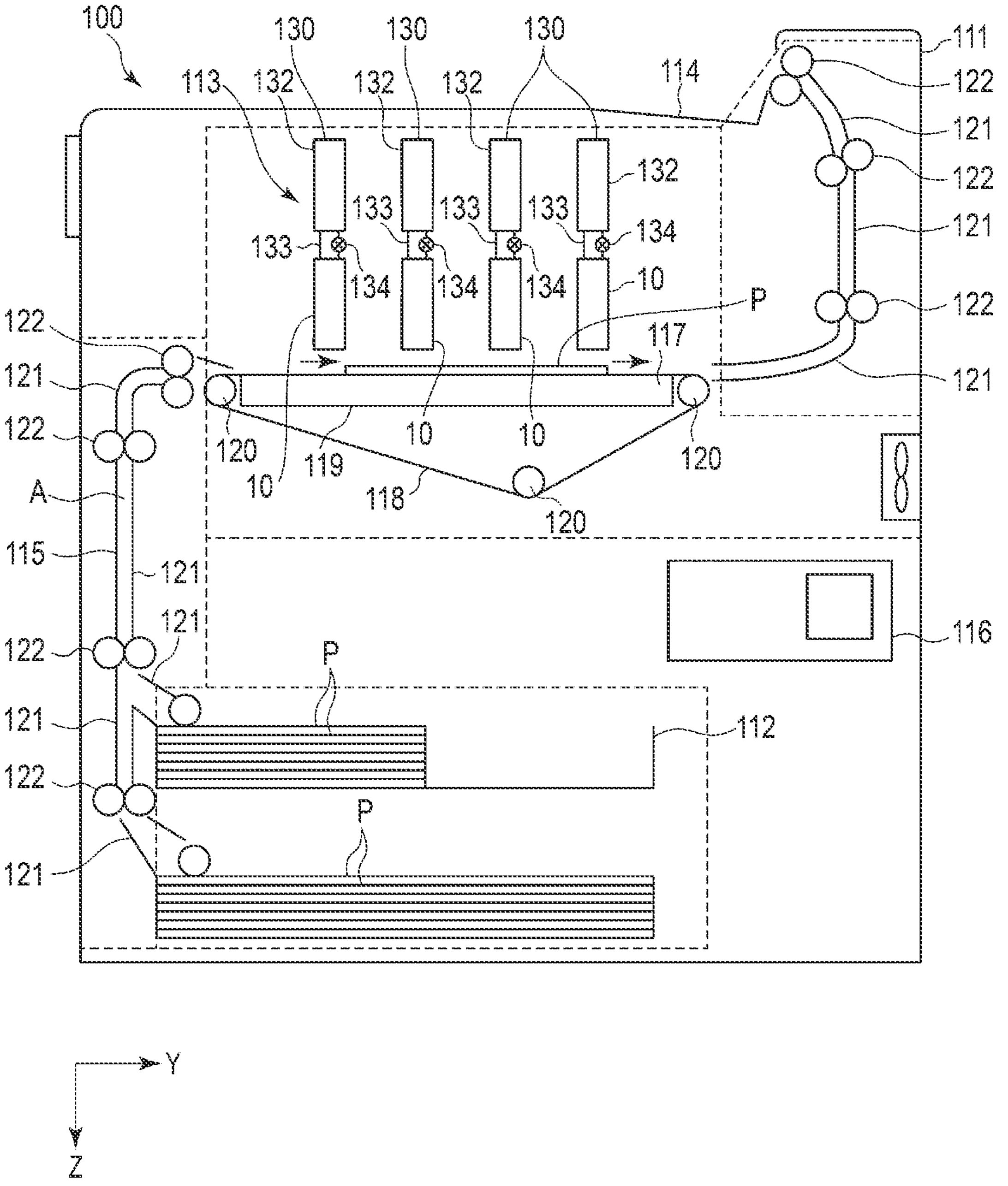
FIG. 8 is a schematic diagram illustrating an inkjet printer according to an embodiment.

Hereinafter, a configuration of an inkjet head 10, which is a liquid ejection head according to a first embodiment, will be described with reference to FIGS. 1 to 6. FIG. 1 is a perspective view illustrating the inkjet head according to the first embodiment. FIG. 2 is an exploded view of a portion of the inkjet head. FIG. 3 is an enlarged view illustrating a portion of the inkjet head. FIGS. 4 and 5 are enlarged cross-sectional views illustrating aspects of the inkjet head. FIG. 6 depicts aspects related to a method for manufacturing an inkjet head. FIG. 7 depicts aspects related to the inkjet heads according to an embodiment and a comparative example. FIG. 8 is a schematic diagram illustrating an inkjet printer, which is one type of a liquid ejection device. It is noted that, in the present description, the nozzles 28 and the pressure chambers 31 of the inkjet head 10 are arranged along the X axis, the pressure chambers 31 extend lengthwise along the Y axis, and the liquid ejection direction is along the Z axis. These depictions are for purposes of description, and embodiments are not limited thereto.

The inkjet head 10 is a device for ejecting ink, and is mounted, for example, inside an inkjet printer. The inkjet head 10 is a shear-mode shared-wall type inkjet head. For example, the inkjet head 10 is an independently driven inkjet head type in which pressure chambers 31 and air chambers 32 are alternately arranged. The air chamber 32 is a chamber (void) into which ink is not supplied and does not need to have any nozzles 28. In the present embodiment, the inkjet head 10 is a so-called side shooter type inkjet head.

The inkjet head 10 has an actuator base 11, a nozzle plate 12, and a frame 13. The actuator base 11 is an example of a base material. An ink chamber 27 is inside the inkjet head 10. In the present example, ink is the liquid ejected by inkjet head 10, but embodiments are not limited to ink.

The inkjet head 10 may include or incorporate components such as a circuit board 17 for controlling the operations of the inkjet head 10 and a manifold 18 forming a portion of the path between the inkjet head 10 and an ink tank (reservoir).

As illustrated in FIGS. 2 to 5, the actuator base 11 includes a board 21 and a pair of actuator portions 22.

The board 21 is formed in a rectangular plate shape from a ceramic such as alumina. The board 21 has a flat mounting surface. The pair of actuator portions 22 are joined to the mounting surface of the board. A plurality of supply holes 25 and a plurality of discharge holes 26 are formed in the board 21.

As illustrated in FIGS. 2 and 3, a pattern wiring 211 is formed on the board 21 of the actuator base 11. The pattern wiring 211 is formed of, for example, a nickel thin film. The pattern wiring 211 is configured in a predetermined pattern shape to be connected to an electrode layer 34 (electrode) formed on the actuator portion 22. Portions of the pattern wiring 211 may be individually addressable segments or portions connected in common with other portions of the pattern wiring 211.

The supply holes 25 are provided to be aligned in the longitudinal direction of the actuator portions 22 in a central (middle) portion of the board 21. The supply holes 25 are between the pair of actuator portions 22 in the X direction. The supply hole 25 communicates with (fluidly connects to) an ink supply portion (inlet side) of the manifold 18. The supply hole 25 is connected to the ink tank via the ink supply portion. The supply hole 25 receives the ink from the ink tank to the ink chamber 27. It is noted that the supply holes 25 are not limited to a plurality of circular holes as illustrated in FIG. 2, and, in some examples, a long hole (elongated hole or oval) extending in the X direction along the actuator portion 22 may be used.

The discharge holes 26 are aligned in two columns with the supply hole 25 and the pair of the actuator portions 22 interposed therebetween. The discharge hole 26 communicates with the ink discharge portion (outlet side) of the manifold 18. The discharge hole 26 is connected to the ink tank through the ink discharge portion. The discharge hole 26 permits return of the ink from the ink chamber 27 to the ink tank.

A pair of the actuator portions 22 are adhered to the mounting surface of the board 21. The actuator portions 22 are aligned in two columns on the board 21 with the supply holes 25 interposed therebetween. Each actuator portion 22 is formed of two plate-like piezoelectric bodies made of, for example, lead zirconate titanate (PZT). The two piezoelectric bodies are bonded together so that polarization directions thereof are opposite to each other in the thickness direction. The actuator portion 22 is adhered to the mounting surface of the board 21 with, for example, a thermosetting epoxy adhesive. As illustrated in FIG. 2, the actuator portions 22 are aligned with a column of nozzles 28. The actuator portion 22 divides the ink chamber 27 into a first common chamber 271 on which the supply hole 25 opens and a second common chamber 272 on which the discharge hole 26 opens. The first common chamber 271 is shared by the pair of actuator portions 22 and a second common chamber 272 is to outside of each actuator portion 22.

The actuator portion 22 slopes gradually increased from a top surface portion 222 side toward the board side. The cross-sectional shape along a direction (lateral direction) perpendicular to the longitudinal direction of the actuator portion 22 is a trapezoidal shape. The side surface portion 221 of the actuator portion 22 has inclined surfaces that are angled. The top surface portion 222 of the actuator portion 22 can be adhered to the nozzle plate 12 via an adhesive layer 291 as illustrated in FIG. 6.

The actuator portion 22 includes a diaphragm portion 240 provided at the outlet/inlet of the respective pressure chambers 31. The actuator portion 22 has a plurality of element walls 33 (side walls) and has grooves 14 forming pressure chambers 31 and air chambers 32 between the element walls 33. The element wall 33 between adjacent grooves 14 functions as a driving element of a pressure chamber 31.

As illustrated in FIGS. 1 to 5, the bottom surface of the groove 14 and the main surface of the board 21 are connected by inclined side surface portions 221. The plurality of pressure chambers 31 and the plurality of air chambers 32 are arranged alternately with each other. Each of the pressure chambers 31 and the air chambers 32 extend in a direction crossing the longitudinal direction of the actuator portion 22 and arranged in parallel in the longitudinal direction (X direction) of the actuator portion 22. The grooves 14 forming the pressure chambers 31 and the air chambers 32 can be formed by a dicer (e.g., a saw blade), and the bottom portions of the grooves 14 thus formed may have a curved surface shape having a radius of curvature (R). In the present embodiment, for example, with respect to the groove 14, a width dimension in the X direction is configured to be constant up to almost the bottom of the groove 14, thereafter the groove 14 is a gently curved surface, and a cross section perpendicular to the Y direction, has a U-type shape. It is noted that in other examples the groove 14 may have a constant width for its entire depth, or the groove may have a fully rectangular cross section, that is, a flat bottom surface.

It is noted that the shape of the pressure chamber 31 and the shape of the air chamber 32 may be different in some examples. The element wall 33 is formed between an adjacent pressure chamber 31 and air chamber 32 and deforms in response to the drive signal to change the volume of the pressure chamber 31.

The electrode layers 34 are provided on the inner wall surfaces of the pressure chamber 31 and the air chamber 32 of the actuator base 11, respectively. The electrode layer 34 is formed, for example, of a conductive film such as a nickel thin film. The electrode layer 34 extends from an inner surface of the groove 14 onto the board 21 and is connected to the pattern wiring 211. For example, the electrode layer 34 is formed at least on the side surface portion of the element wall 33, that is, a side wall surface of the groove 14 constituting the pressure chamber 31. The electrode layer 34 may be formed, for example, on both the side surface portion and the bottom surface portion of the pressure chamber 31.

An anti-reflection film (light anti-reflection film) 35 is formed on the electrode layer 34 on the inner wall surface of the pressure chamber 31 of the actuator base 11. For example, the anti-reflection film 35 is formed of a film having a higher light absorbance (or less reflectivity) than the electrodes. For example, the anti-reflection film 35 is formed at least on the side surface portions of the element walls 33, that is, on the side wall surfaces and bottom surfaces of the grooves 14 constituting the pressure chambers 31. The anti-reflection film 35 may be formed, for example, on a portion of the side surface portion and the bottom surface portion of the pressure chamber 31. The anti-reflection film 35 is formed at least on the electrode layer 34. The electrode layer 34 is formed between the element wall 33 and the anti-reflection film 35.

The anti-reflection film 35 is made of a material having a high light absorbance at the relevant wavelengths (photolithographically relevant wavelengths). The anti-reflection film has a higher light absorbance than the electrode layer 34. The anti-reflection film may be made of an organic material or may be an inorganic material. In the case of an organic material, the anti-reflection film may be formed by a film formation technique such as spray coating, vapor deposition, or the like, and in the case of an inorganic material, the anti-reflection film may be formed by sputtering, vapor deposition, or the like. As the anti-reflection film 35, an adhesive based on an epoxy resin or the like may be used.

The plurality of pressure chambers 31 communicate with the plurality of nozzles 28 of the nozzle plate 12 joined to the top of the element wall 33. Both ends of the pressure chamber 31 communicate with the ink chamber 27. More particularly, one end opens to the first common chamber 271 27 and the other end opens to the second common chamber 272. Therefore, the ink flows in from one end of the pressure chamber 31 and out from the other end. The diaphragm portion 240 has a diaphragm port 242 designed to provide a larger fluid resistance than the inside of the unobstructed pressure chamber 31. The diaphragm port 242 is formed at the open ends (communication ports) of the pressure chamber 31 to be between the pressure chamber 31 and the ink chamber 27. As an example, in the present embodiment, the diaphragm portions 240 are formed at both ends of the pressure chamber 31.

As illustrated in FIGS. 4 and 5, the diaphragm portion 240 is to narrow (partially block) the opening of the pressure chamber 31 connected to the ink chamber 27 in the X direction. As an example, the diaphragm portion 240 forms the diaphragm port 242 which has a slit-shaped opening with protruding portions 241 serving as a diaphragm wall. The protruding portions are formed from a photosensitive resin. For example, the protruding portion 241 is formed from photosensitive resin coated over the anti-reflection film 35.

The protruding portion 241 protrudes outwardly from the element wall 33 into the groove 14 at the end of the pressure chamber 31. In the present embodiment, the protruding portions 241 are on an adjacent pair of the element walls 33 forming both sides of the pressure chamber 31, that is, the element walls 33 on both sides of the groove 14.

For example, the protruding portion 241 may be formed over the entire depth of the groove 14 or may be formed partially in the depth direction.

The groove 14 is not completely blocked by the protruding portions 241. The diaphragm port 242 is formed between the pair of the protruding portions 241. The diaphragm port 242 provides a flow path cross-sectional area that is less than the flow path cross-sectional area of the pressure chamber 31. That is, the protruding portions 241 increase fluid resistance.

The diaphragm portion 240 can be formed by forming a photosensitive resin film 244 on the anti-reflection film 35 on the inner walls of the pressure chambers 31 and the air chambers 32, and then curing the portions to form the protruding portions 241 in an exposure process.

It is noted that, if the fluid resistance of the diaphragm portion 240 is too large, the supplying of the ink to the pressure chamber 31 after the ejection of the ink liquid droplets will be delayed, which will hinder the speeding up of the ejection process. In addition, the swelling of the meniscus depends on the ink viscosity, the ejection volume, the drive frequency, and the like. Therefore, the shape of the protruding portion 241 and the size and position of the diaphragm port 242 may be set so as to provide fluid resistance according to particular expected ink supplying conditions and meniscus swelling characteristics. It is noted that, in some examples, the diaphragm portions 240 on opposite sides or ends may have different configurations. In an example, each of the projections 241 provided on the sides of a communication port of the pressure chamber 31 has a rectangular cross-section and a uniform cross-sectional shape along the depth direction.

The air chamber 32 is closed (covered) by the nozzle plate 12 joined to the top. In addition, both ends of the plurality of air chambers 32 are blocked by a cover portion 23 made of, for example, a photosensitive resin material. That is, between the first common chamber 271 and the air chamber 32 and between the second common chamber 272 and the air chamber 32, the cover portion 23 is arranged so the air chamber 32 is separated from the ink chamber 27. For this reason, ink does not flow into the air chamber 32.

For example, the cover portion 23 is formed by applying photosensitive resin to both ends of the air chamber 32 in the same process as used for the formation of the protruding portions 241. In other examples, the cover portion 23 may be formed in a separate process from the protruding portions 241.

In some examples, the protruding portion 241 and the cover portion 23 may be formed to extend outward in the Y direction from both ends of the groove 14*s* and these portions may be integrally continuous.

The nozzle plate 12 is formed of, for example, a rectangular film made of polyimide. The nozzle plate 12 faces the mounting surface of the actuator base 11. The plurality of nozzles 28 are formed in the nozzle plate 12 so as to penetrate the nozzle plate 12 in the thickness direction.

In this example, a nozzle 28 is provided for each of the pressure chambers 31 on a one-to-one basis. The respective nozzle opens on the pressure chamber 31. The plurality of nozzles 28 are aligned along the first direction and arranged in two columns corresponding to the pair of the actuator portions 22. Each nozzle 28 is configured in a tubular shape with an axis extending in the Z direction. For example, the nozzle 28 may have a constant diameter or may have a shape tapering toward the central portion or the tip portion. The nozzles 28 are arranged to face the middle of the pressure chambers 31. In some examples, nozzles 28 may be arranged at alternating ends of the pressure chambers 31.

The frame 13 is made of, for example, a nickel alloy and has a rectangular shape. The frame 13 is interposed between the mounting surface of the actuator base 11 and the nozzle plate 12. The frame 13 is adhered to the mounting surface of the actuator base 11 and the nozzle plate 12, respectively. That is, the nozzle plate 12 is attached to the actuator base 11 via the frame 13.

The manifold 18 is joined to the opposite side of the actuator base 11 from the nozzle plate 12. Inside the manifold 18, an ink supply unit, which is a flow path communicating with the supply hole 25, and an ink discharge portion, which is a flow path communicating with the discharge hole 26, are formed.

The circuit board 17 in this example is a film carrier package (FCP). The circuit board 17 has a flexible resin film 51 on which a plurality of wirings are formed and a driving IC 52 connected to the plurality of wirings of the film 51. The driving IC 52 is electrically coupled to the electrode layers 34 via the wiring of the film 51 and the pattern wiring 211.

The ink chamber 27 surrounded by the actuator base 11, the nozzle plate 12, and the frame 13 is formed inside the inkjet head 10 configured as described above. That is, the ink chamber 27 is formed between the actuator base 11 and the nozzle plate 12. For example, the ink chamber 27 is divided into three sections in the second direction by the two actuator portions 22 and includes two second common chambers 272 as common chambers opened to the discharge holes 26 and the first common chamber 271 as a common chamber opened to the supply holes 25. The first common chamber 271 and the second common chamber 272 communicate with the plurality of the pressure chambers 31.

In the inkjet head 10, ink circulates between the ink tank and the ink chamber 27 through the supply hole 25, the pressure chamber 31, and the discharge hole 26. For example, the driving IC 52 applies a drive voltage to the electrode layer 34 of a pressure chamber 31 via the wiring of the film 51 in response to a signal input from a control unit of an inkjet printer, and thus, a potential difference occurs between the electrode layer 34 on the pressure chamber 31 and the electrode layer 34 on the air chamber 32, so that the element wall 33 is selectively deformed in a shear mode. By deforming the element wall 33 in response to the drive signal, the volume of the pressure chamber 31 is changed.

Due to the shear mode deformation of the element wall 33, the volume of the pressure chamber 31 can be increased, and thus, the pressure is decreased. Accordingly, the ink from the ink chamber 27 flows into the pressure chamber 31.

While the volume of the pressure chamber 31 is increased, the driving IC 52 applies a drive voltage of opposite potential to the electrode layer 34 of the pressure chamber 31. Accordingly, due to the shear mode deformation of the element wall 33, the volume of the pressure chamber 31 is decreased, and thus, the pressure is increased. Accordingly, the ink in the pressure chamber 31 is ejected from the nozzle 28.

As a method for manufacturing the inkjet head 10, a piezoelectric member can first be attached to the plate-like board 21 with an adhesive or the like, and a machining process using a dicing saw, a cutting blade, or the like is performed to form the grooves 14 and the like in the piezoelectric member on the actuator base 11. It is noted that, for example, a block-shaped base member having a thickness corresponding to a plurality of sheets may be formed in advance and then divided to manufacture a plurality of actuator bases 11 having a predetermined shape.

Subsequently, the electrode layer 34 and the pattern wiring 211 are formed on the inner surfaces of the grooves 14 and the front surface of the board 21.

The anti-reflection film 35 is also formed on the electrode layer 34 on the inner surface of the grooves 14 constituting at least the pressure chambers 31. As described above, the electrode layer 34 and the pattern wiring 211 are formed at predetermined locations on the surface of the actuator base 11, and the electrode layer 34 is covered with the anti-reflection film 35 on the inner surface of the groove 14.

Next, the diaphragm portion 240 is formed at the ends of the pressure chambers 31. For example, a method for forming the diaphragm portion 240 includes forming a photosensitive resin film in the grooves 14 constituting the pressure chambers 31 and followed by an exposure and development process to shape the diaphragm portion 240 as intended.

As a film forming process, as illustrated in Act 11 in FIG. 6, a photosensitive resin film 244 is formed on the inner wall of the pressure chamber 31. For example, the photosensitive resin film 244 may reach the outside of the groove 14 in the extension direction and may be integrally continuous outside the groove 14.

Subsequently, as the patterning process, the photosensitive resin films 244 are patterned on both ends of the pressure chamber 31 by selective exposure followed development processes. For example, in the present embodiment, after curing the portions 2441 constituting the protruding portions 241, the diaphragm portion 240 having the protruding portions 241 is formed by performing a development processing in which unexposed portions are dissolved and removed.

In the exposure process of the patterning process, if necessary, a photomask 245 may be used in an ultraviolet exposure process. Such a exposure process may be repeated as necessary. The conditions of exposure direction, exposure intensity, and the like may be appropriately set. For example, as the exposure process, as illustrated in Act 11, the photomask 245 is arranged on the top side of the element wall 33, and exposure is performed from the top side through the photomask 245. Then, the exposure is performed to the depth reaching the bottom of the groove 14, so that the photosensitive resin film 244 of the portion 2441 constituting the protruding portion 241 is cured, and thus, only the portion 2442 corresponding to the diaphragm port 242 is left uncured. As an example, by setting the exposure direction in the depth direction of the pressure chamber 31, the protruding portions 241 on both sides can be exposed to be patterned at the same time.

Since the inner surface of the groove 14 was covered with the anti-reflection film 35 beforehand, the portions other than the intended exposure portions are prevented from being irradiated with the reflected light. That is, the effects of the reflection of the light from the bottom and the side walls of the pressure chamber 31 during the exposure are reduced so that a desired exposure pattern can be formed. In the example illustrated by the Comparative Example 1 in FIG. 7, without the anti-reflection film, the light is reflected at various angles inside the groove by the curved bottom surface and sidewalls. The photosensitive resin may be inadvertently exposed by such reflected light, so that it may be difficult to obtain a desired shape when forming the diaphragm 240 portion of the like. For example, in the case of forming the diaphragm portion 240 inside the groove 14 with a photosensitive resin, from the viewpoint of ensuring adhesion, a larger exposure amount is generally better, but the risk of shape defects due to the reflected light is increased with increased exposure amount. That is, without the light anti-reflection film, it is difficult to form the diaphragm in the desired shape since the ultraviolet rays will be reflected by the electrode surfaces on the bottom and the side walls of the pressure chamber 31.

On the other hand, as illustrated in FIG. 7, in the inkjet head 10 of the present embodiment, the anti-reflection film 35 is formed inside the groove 14, and thus, the ultraviolet light used when forming the diaphragm portion 240 is absorbed by the anti-reflection film 35, so that the shape defects that might otherwise occur due to reflected light can be suppressed.

By washing away unexposed resin with a developer solution, as illustrated in Act 12, the diaphragm portion 240 is formed at the outlet/inlet of the pressure chamber 31.

As described above, a protruding portion 241 made of a resin film is formed at the outlet/inlet of the pressure chamber 31, and a diaphragm portion 240 is formed between the protruding portions 241.

The diaphragm portion 240 and the cover portion 23 may be formed together at the same time in the same processing. Alternatively, the cover portion 23 may be formed in a separate process before or after the diaphragm portion 240. In the present embodiment, the photosensitive resin film 244 is continuous outside the groove 14, and thus, the cover portion 23 and the adjacent protruding portions 241 are formed continuously and integrally.

The actuator base 11 is assembled to the manifold 18, and the frame 13 is attached to one surface of the board 21 of the actuator base 11 with a thermoplastic resin adhesive sheet.

Then, the assembled frame 13, the top of the element wall 33 of the actuator portion 22, and the surface of the protruding portion 241 on the nozzle plate 12 side are polished so as to be the same surface level. Then, the nozzle plate 12 is adhered to the top of the element wall 33, the frame 13, and the polished surface of the protruding portion 241. For example, the adhesive layer 291 is formed by applying the adhesive 29 on the surface of the nozzle plate 12 facing the pressure chambers 31, and the nozzles 28 are position-aligned so as to face each other, and after affixing, the adhesive 29 can be cured after joining. As described above, the nozzle plate 12 is joined to the actuator portion 22, and the adhesive layer 291 is provided between the element wall 33 and the nozzle plate 12. As illustrated in FIG. 1, the inkjet head 10 is completed by connecting the driving IC 52 and the circuit board 17 to the pattern wiring 211 formed on the main surface of the board 21 via a flexible printed circuit board or the like.

Hereinafter, an example of an inkjet printer 100 including the inkjet head 10 will be described with reference to FIG. 8. The inkjet printer 100 includes a housing 111, a medium supply unit 112, an image forming unit 113, a medium discharge unit 114, a conveying device 115, and a control unit 116.

The inkjet printer 100 is a liquid ejection device that performs an image forming process on paper P by ejecting a liquid such as ink while conveying a paper P along a predetermined conveyance path A from the medium supply unit 112 through the image forming unit 113 to the medium discharge unit 114.

The housing 111 constitutes an outer shell of the inkjet printer 100. A discharge port for discharging the paper P to the outside is provided at a predetermined position of the housing 111.

The medium supply unit 112 includes a plurality of paper feed cassettes to hold a plurality of sheets of the paper P of various sizes.

The medium discharge unit 114 includes a paper discharge tray to receive the paper P discharged from the discharge port.

The image forming unit 113 includes a supporting portion 117 for supporting the paper P during processing and a plurality of head units 130 arranged above the supporting portion 117.

The supporting portion 117 includes a conveying belt 118 provided in a loop shape in a predetermined area for image formation, a supporting plate 119 supporting the conveying belt 118 from the back side, and a plurality of belt rollers 120 provided on the back side of the conveying belt 118.

During the image formation, the supporting portion 117 supports the paper P and feeds paper P at a predetermined timing by rotation of the belt roller 120, so that the paper P is carried to a downstream side by the conveying belt 118.

The head unit 130 includes inkjet heads 10 for four different colors in this example, ink tanks 132 for each inkjet head 10, a connection flow path 133 connecting the inkjet heads 10 and the ink tanks 132, and a circulation pump 134. The head unit 130 is a circulation type head unit that constantly circulates the liquid through the inkjet head 10 and returns the liquid to the respective ink tank 132.

In the present embodiment, the inkjet heads 10 for cyan, magenta, yellow, and black are provided along with the ink tanks 132 that contain the respective inks of these colors. The ink tank 132 is connected to the inkjet head 10 by the connection flow path 133. The connection flow path 133 includes a supply flow path connected to a supply port of the inkjet head 10 and a recovery flow path connected to the discharge port of the inkjet head 10.

In addition, a negative pressure control device such as a pump is connected to the ink tank 132. The negative pressure control device performs negative pressure control inside the ink tank 132, so that the ink in each nozzle 28 of the inkjet head 10 has a predetermined meniscus shape. The meniscus control may be performed according to the hydrologic head values associated with the particular inkjet head 10 and the ink tank 132.

The circulation pump 134 is, for example, a liquid feed pump such as a piezoelectric pump. The circulation pump 134 is provided in the supply flow path. The circulation pump 134 is connected to the drive circuit of the control unit 116 by wiring and is configured to be controllable under the control of a central processing unit (CPU) or the like. The circulation pump 134 circulates the liquid along a circulation flow path between the inkjet head 10 and the ink tank 132.

The conveying device 115 conveys the paper P along the conveyance path A from the medium supply unit 112 through the image forming unit 113 to the medium discharge unit 114. The conveying device 115 includes a plurality of guide plate pairs 121 arranged along the conveyance path A and a plurality of conveying rollers 122.

Each of the guide plate pairs 121 may be a pair of plate members arranged to face each other with the paper P passing therebetween.

The conveying rollers 122 are driven under the control of the control unit 116, so that the paper P is conveyed to the downstream side along the conveyance path A. It is noted that sensors for detecting the state of the paper may be arranged at various points along the conveyance path A.

The control unit 116 (controller) may be or include a control circuit such as a CPU, a read only memory (ROM) storing various programs, a random access memory (RAM) for temporarily storing various types of data, image data, and the like, and an interface unit receiving data from the outside and outputting data to the outside.

In the inkjet printer 100, when the user provides a print instruction by operating a user interface, for example, the control unit 116 drives the conveying device 115 to convey the paper P and outputs a print signal to the head unit 130 at a predetermined timing, so that the inkjet head 10 is driven to form the intended image. For the ejection operation, the inkjet head 10 a drive signal is transmitted to the driving IC 52 according to an image signal corresponding to the intended image data, and a drive voltage is selectively applied to the electrode layer 34 of a pressure chamber 31 via the wiring to drive the element wall 33 of the actuator portion 22, so that the ink is ejected from the nozzles 28, and an image is formed on the paper P on the conveying belt 118. Further, the control unit 116 drives the circulation pump 134 to circulate the liquid in the circulation flow path passing through the ink tank 132 and the inkjet head 10.

According to an embodiment, ejection stability can be improved by forming a diaphragm portion 240 at the outlet/inlet of the pressure chamber 31.

The diaphragm portion 240 has openings to the first common chamber 271 and the second common chamber 272, which are chambers shared by the pressure chambers 31. The flow path cross-sectional area of the diaphragm portion 240 is smaller than that of the pressure chambers 31. For this reason, the swelling of the meniscus is reduced when the inkjet head 10 ejects the liquid. Therefore, the meniscus recovers quickly, and thus, the influence on the next ejection can be reduced, so that the ejection stability can be improved.

In addition, according to an embodiment, the diaphragm portion 240 can be formed by forming a photosensitive resin film in the grooves 14 on an anti-reflection film 35 and performing the patterning by an exposure process, so that the diaphragm portion 240 can be easily formed with a small number of processes, at low cost. Furthermore, since the thickness and shape of the protruding portion 241 can be selected relatively freely in exposure and development process, free designing of the fluid resistance of the diaphragm portion 240 is also facilitated. In addition, in an embodiment, since the side surface portion 221 of the actuator portion 22 in an inclined surface, the exposure direction is less restricted, and the exposure and development processes are facilitated. In addition, the anti-reflection film 35 formed on the surface of the electrode layer 34 may also be effective in protecting the electrode layer 34 and improving adhesion of the photosensitive resin.

In an embodiment, the diaphragm portion 240 for increasing the fluid resistance is configured to have the pair of protruding portions 241 formed on the wall surfaces of the element walls 33 on both sides of the pressure chamber 31, but the shape of the diaphragm portion 240 is not limited thereto. For example, a protrusion may be formed on a portion of the bottom surface of the pressure chamber 31 or a portion on the nozzle plate 12 side, or the bottom of the pressure chamber 31 may be partially filled with the photosensitive resin. In an example, the diaphragm port 242 has a slit shape extending in the depth direction of the groove 14, but the diaphragm port 242 may extend in other directions or may have other shapes such as circular and elliptic shapes instead of a generally rectangular slit. In addition, the diaphragm portions 240 on either side may have different configurations or shapes. For example, the diaphragm portion 240 may be only on one end of the pressure chamber 31 instead of both. The protruding portions 241 may be differently shaped on opposite ends of the pressure chamber 31. A protruding portion 241 may be present only on one sidewall rather than both, in some examples.

In an example, the cover portion 23 and the protruding portion 241 are formed in part inside the grooves 14 and thus fill part of each groove 14, but the shape is not limited to thereto. For example, on the side surface of the actuator portion 22, the cover portion 23 blocking the air chamber 32 and the protruding portion 241 partially blocking the communication port of the pressure chamber 31 may be formed outside the grooves 14, and thus, the diaphragm portion 240 may be formed outside the groove 14 and the element wall 33.

In an example, an actuator may be provided on an end face of the board 21 rather than a main surface thereof. In addition, the number of nozzle columns is not limited and may be one column or three or more columns.

In an embodiment, an actuator base 11 comprises a stacked piezoelectric member made of piezoelectric material on the board 21, but embodiments are not limited to thereto. For example, the actuator base 11 may be formed with only the stacked piezoelectric member without the board. In addition, instead of using the two piezoelectric members, one piezoelectric member may be used.

In some examples, the air chamber 32 may communicate with one of the first common chamber 271 and the second common chamber 272.

In some examples, the supply side and the discharge side may be reversed or may be configured to be switchable.

In an embodiment, one side of the pressure chamber 31 is the supply side, and the other side is the discharge side. Although a circulating type inkjet head where the first common chamber fluid flows in from one side of the pressure chamber and flows out from the other side was explained, the present disclosure is not limited to thereto. For example, the inkjet head may be of a non-circulating type. Furthermore, the common chambers on both sides of the pressure chamber 31 may be a supply side chamber in some examples, and the configuration may be such that the fluid flows into the pressure chamber 31 from both sides. That is, the configuration may be such that the fluid may flow in from both sides of the pressure chamber 31 and may flow out from a nozzle 28 arranged in the center of the pressure chamber 31. Even in this case, by providing the diaphragm portions 240 at the communication ports serving as inlets on both sides of the pressure chamber 31, the fluid resistance can be increased, and the ejection efficiency can be improved. In such an example, the configurations of the diaphragm portions 240 formed at the opposite ends may be different or the same.

In an embodiment, the diaphragm portions 240 are formed at both ends of the pressure chamber 31, but the present disclosure is not limited thereto, and the diaphragm portion 240 may be formed only on one end. For example, a diaphragm portion 240 having a higher fluid resistance is formed on one end, but the other end may be configured to have the same cross-sectional area as the inside of the pressure chamber 31.

In an embodiment, a side shooter type inkjet head in which both sides of the pressure chamber 31 communicate with an ink chamber is exemplified, but the present disclosure is not limited to thereto. For example, an end shooter type in which only one end of the pressure chamber 31 communicates with an ink chamber 27 may be adopted.

In an embodiment, an example where the protruding portions 241 are formed on both sidewalls is described, but the present disclosure is not limited to thereto. For example, the protruding portion 241 may be formed only on one element wall 33 instead of both.

In The liquid to be ejected is not limited to ink for printing, and a liquid containing conductive particles for forming a wiring pattern on a printed wiring board may be adopted in other examples. In general, the liquid to be ejected is not a limitation.

In an embodiment, the inkjet head is used in a liquid ejection device such as an inkjet printer, but the present disclosure is not limited thereto and embodiments may include, for example, 3D printers, industrial manufacturing machines, and medical applications.

According to at least one embodiment described above, it is possible to provide a liquid ejection head and a method for manufacturing the liquid ejection head capable of ensuring stable ejection characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

an actuator with a plurality of pressure chambers spaced from each other in a first direction, each pressure chamber extending lengthwise in a second direction intersecting the first direction;

an electrode on an inner surface of the pressure chambers;

an anti-reflection film on the electrode on the inner surface of the pressure chambers; and a diaphragm portion at an end of each pressure chamber, the diaphragm portion providing a flow cross-section that is less than the pressure chamber and being between the pressure chamber and a common chamber to which the plurality of pressure chambers are fluidly connected, wherein the diaphragm portion comprises a cured photosensitive resin, and the anti-reflection film has an absorbance value at a light wavelength which cures the cured photosensitive resin that is greater than an absorbance value of the electrode at the light wavelength.

2. The liquid ejection head according to claim 1, wherein the diaphragm portion covers a portion of the anti-reflection film.

3. The liquid ejection head according to claim 1, further comprising:

a nozzle plate covering the plurality of pressure chambers.

4. The liquid ejection head according to claim 1, wherein the actuator portion has a plurality of air chambers spaced from each other in the first direction, each air chamber extending lengthwise in the second direction and between an adjacent pair of pressure chambers in the second direction, and the diaphragm portions extend between the adjacent pair of pressure chambers and block an end of the air chamber.

5. The liquid ejection head according to claim 1, wherein the liquid ejection head is a side shooter type liquid ejection head.

6. The liquid ejection head according to claim 1, wherein the diaphragm portion extends in the second direction beyond the end of the pressure chamber.

7. The liquid ejection head according to claim 1, wherein the anti-reflection film is an organic film.

8. The liquid ejection head according to claim 1, wherein the anti-reflection film is an inorganic film.

9. The liquid ejection head according to claim 1, wherein the light wavelength is in an ultraviolet range.

10. An inkjet head, comprising:

a piezoelectric body having a plurality of grooves formed therein, the grooves being spaced from each other in a first direction, extending lengthwise in a second direction, and extending into the piezoelectric body in a third direction;

a metallic electrode film on an inner surface of at least some of the plurality of grooves;

an anti-reflection film covering at least a portion of the metallic electrode film on the inner surface of at least some of the plurality of grooves; and a cured photosensitive resin covering at least a portion of the anti-reflection film, wherein the cured photosensitive resin partially blocks ends of at least some of the plurality of grooves, and the anti-reflection film has an absorbance value at a light wavelength which cures the cured photosensitive resin that is greater than an absorbance value of the metallic electrode film at the light wavelength.

11. The inkjet head according to claim 10, wherein the cured photosensitive resin completely blocks ends of every other one of the grooves in the plurality grooves and only partially blocks ends of each groove between the grooves in the plurality of grooves with completely blocked ends.

12. The inkjet head according to claim 10, wherein the anti-reflection film is an organic film.

13. The inkjet head according to claim 10, wherein the anti-reflection film is an inorganic film.

14. The inkjet head according to claim 10, wherein the light wavelength is in an ultraviolet range.

15. An image forming apparatus, comprising:

a sheet conveyor; and a liquid ejection head positioned to eject liquid towards a medium on the sheet conveyor, the liquid ejection head including:

an actuator with a plurality of pressure chambers spaced from each other in a first direction, each pressure chamber extending lengthwise in a second direction intersecting the first direction;

an electrode on an inner surface of the pressure chambers;

an anti-reflection film on the electrode on the inner surface of the pressure chambers; and a diaphragm portion at an end of each pressure chamber, the diaphragm portion providing a flow cross-section that is less than the pressure chamber and being between the pressure chamber and a common chamber to which the plurality of pressure chambers are fluidly connected, wherein the diaphragm portion comprises a cured photosensitive resin, and the anti-reflection film has an absorbance value at a light wavelength which cures the cured photosensitive resin that is greater than an absorbance value of the electrode at the light wavelength.

16. The image forming apparatus according to claim 15, wherein the diaphragm portion covers a portion of the anti-reflection film.

17. The image forming apparatus according to claim 15, wherein the liquid ejection head is a side shooter type liquid ejection head.

18. The image forming apparatus according to claim 15, wherein the diaphragm portion extends in the second direction beyond the end of the pressure chamber.

19. The image forming apparatus according to claim 15, wherein the light wavelength is in an ultraviolet range.

* * * * *